United States Patent
Takeda et al.

(10) Patent No.: US 11,688,116 B2
(45) Date of Patent: Jun. 27, 2023

(54) PRESERVING GEOMETRY DETAILS IN A SEQUENCE OF TRACKED MESHES

(71) Applicants: SONY GROUP CORPORATION, Tokyo (JP); Sony Corporation of America, New York, NY (US)

(72) Inventors: Hiroyuki Takeda, San Jose, CA (US); Kendai Furukawa, Tokyo (JP); Mohammad Gharavi-Alkhansari, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 97 days.

(21) Appl. No.: 17/411,432

(22) Filed: Aug. 25, 2021

(65) Prior Publication Data
US 2023/0062756 A1  Mar. 2, 2023

(51) Int. Cl.
*G06T 13/40* (2011.01)
*G06T 17/20* (2006.01)
(Continued)

(52) U.S. Cl.
CPC .............. *G06T 13/40* (2013.01); *G06T 7/251* (2017.01); *G06T 17/205* (2013.01); *H04N 5/04* (2013.01); *H04N 23/90* (2023.01); *G06T 2207/10016* (2013.01); *G06T 2207/20081* (2013.01); *G06T 2207/20084* (2013.01); *G06T 2207/30201* (2013.01)

(58) Field of Classification Search
CPC ......... G06T 2207/10016; G06T 17/205; G06T 7/251
See application file for complete search history.

(56) References Cited

U.S. PATENT DOCUMENTS 9,036,898 B1  5/2015  Beeler et al.
10,431,000 B2  10/2019  Zhang
(Continued)

OTHER PUBLICATIONS

Sun et al., Tracking Vertex Flow and Model Adaptation for Three-Dimensional Spatiotemporal Face Analysis, IEEE Transactions on Systems, Man, and Cybernetics—Part A: Systems and Humans, vol. 40, No. 3, May 2010, pp. 461-474 (Year: 2010).*

(Continued)

*Primary Examiner* — Matthew Salvucci
(74) *Attorney, Agent, or Firm* — Chip Law Group

(57) ABSTRACT

An electronic device and method of preservation of geometry details in tracked meshes is provided. A set of three-dimensional (3D) scans and a sequence of tracked meshes of an object of interest are acquired. The sequence of tracked meshes comprises a set of tracked meshes which temporally corresponds to the set of 3D scans. Based on differences between the set of tracked meshes and the set of 3D scans, a set of displacement maps is generated. A plurality of vectors is computed, each of which includes surface tension values associated with mesh vertices of a corresponding tracked mesh. Based on the set of displacement maps and a corresponding set of vectors, a neural network is trained on a task of displacement map generation. The trained neural network model is applied on the plurality of vectors to generate displacement maps. Each tracked mesh is updated based on a corresponding displacement map.

20 Claims, 11 Drawing Sheets

(51) Int. Cl.
   *G06T 7/246*     (2017.01)
   *H04N 5/04*      (2006.01)
   *H04N 23/90*     (2023.01)

(56) References Cited

U.S. PATENT DOCUMENTS

| | | |
|---|---|---|
| 11,055,892 B1 | 7/2021 | Choi |
| 2009/0195545 A1 | 8/2009 | Debevec |
| 2020/0268339 A1* | 8/2020 | Hao ........................ A61B 6/037 |

OTHER PUBLICATIONS

Stefan Volkering, "R3DS Wrap4D", russian3dscanner.com, URL: https://www.russian3dscanner.com/wrap4d/, Aug. 23, 2021, 05 pages.
"Explore the possibilities of Reality Capture", Capturing Reality, URL: https://www.capturingreality.com/, 2021.
Guo, et al., "Real-time Geometry, Albedo and Motion Reconstruction Using a Single RGBD Camera", ACM Transactions on Graphics, vol. 36, No. 4, Mar. 2017, 13 pages.

* cited by examiner

PRESERVING GEOMETRY DETAILS IN A SEQUENCE OF TRACKED MESHES

CROSS-REFERENCE TO RELATED APPLICATIONS/INCORPORATION BY REFERENCE

None.

FIELD

Various embodiments of the disclosure relate to 3D computer graphics, animation, and artificial neural networks. More specifically, various embodiments of the disclosure relate to an electronic device and method of preserving geometry details in a sequence of tracked meshes.

BACKGROUND

Advancements in the field of computer graphics have led to a development of various three-dimensional (3D) modeling and mesh tracking techniques for generation of a sequence of tracked 3D meshes. In computer graphics, mesh tracking is widely used in movie and video game industries to produce 3D computer-graphics (CG) characters. Typically, multiple video cameras may be used to produce tracked meshes. The mesh tracking is a challenging problem, because it may be hard to produce the tracked meshes while preserving geometric details. Many movie and video game studios use only video cameras to produce tracked meshes and separately use digital cameras to capture fine geometric details. The geometric details may be manually cleaned and then added to the 3D CG character models by CG artists, which may be time-consuming.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method of preserving geometry details in a sequence of tracked meshes is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
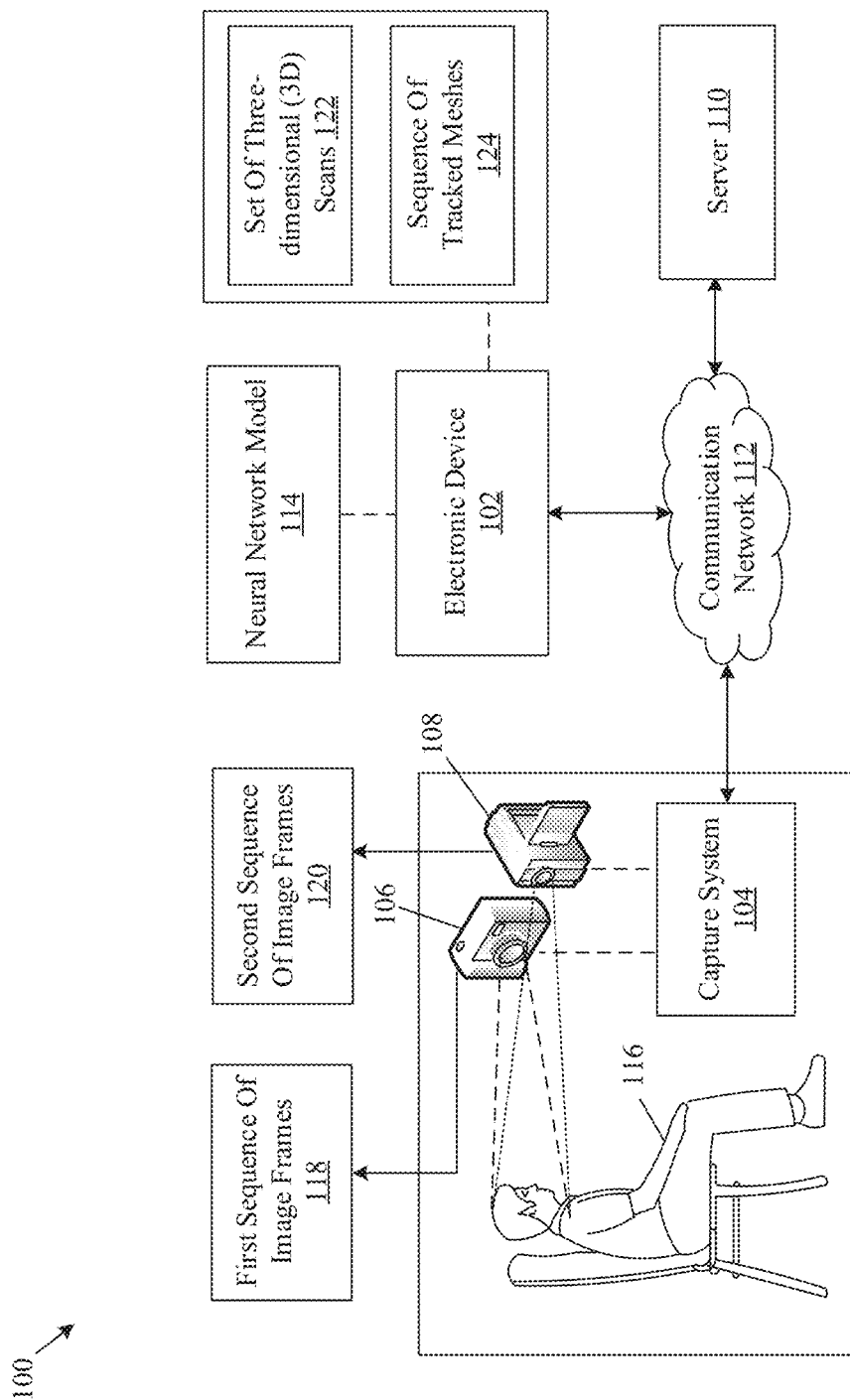
FIG. 1 is a block diagram that illustrates an exemplary network environment for preservation of geometry details in tracked meshes, in accordance with an embodiment of the disclosure.

The following described implementations may be found in the disclosed electronic device and method for preservation of geometry details of a sequence of tracked meshes. Exemplary aspects of the disclosure provide an electronic device that may be configured to acquire a hybrid dataset, i.e. a set of 3D scans (such as high-quality, low-frame-rate raw scans) and a sequence of tracked meshes (such as high-frame-rate tracked meshes) of an object of interest. By way of example, and not limitation, the sequence of tracked meshes may be acquired using a video camera and an existing mesh tracking tool. Similarly, the set of 3D scans may be acquired using a digital still camera or a high-end video camera and an existing photogrammetry tool.

At first, a difference between a tracked mesh and a corresponding 3D scan may be calculated and the difference may be baked in a texture using the UV coordinate of each vertex of the tracked mesh. This operation may yield a displacement map (3-channel image), in which XYZ displacement of vertices may be stored in RGB image channel. The displacement map may be generated for each 3D scan of the set of 3D scans. Thereafter, a surface tension value for each vertex of the tracked meshes may be calculated. Typically, when the face deforms from a neutral expression to another expression, some areas on the face may appear stretched or squeezed. After surface tension values are calculated for all the vertices of the tracked meshes, such values may be stacked into a column vector for tracked mesh. This operation may yield a vector (also referred to as a surface tension vector) for each tracked mesh. For some tracked meshes, both surface tension vectors and displacement maps may be available, but for other tracked meshes of the same sequence, only vectors (surface tension vectors) may be available. Thus, the objective is to generate displacement maps for tracked meshes that may be missing displacement maps. To generate the displacement maps, a vector-to-image function in the form of a neural network model may be trained on a task of displacement map generation. The neural network model may receive a surface tension vector as an input and may output a displacement map, with all the available pairs of surface tension vectors and displacement maps.

After the neural network is trained, the trained neural network may be fed with the surface tension vector of every tracked mesh to generate a displacement map for each tracked mesh. Finally, the generated displacement map may be applied on each tracked mesh (such as a low-quality high-frame rate tracked mesh). This operation may yield a sequence of high-quality, high-frame-rate tracked meshes.

In conventional methods, it may be difficult to produce a sequence of tracked meshes may have both a higher frame-rate than a threshold and a higher quality (in terms of polycount or fine geometric details). Conventionally, the geometric details, such as a skin geometry or microgeometry may be extracted manually using software tools and then may be processed for application on a tracked mesh. This may be a time consuming and a tedious process. In contrast, the disclosure provides for the training of the neural network model on a task of the displacement map generation. After the neural network model is trained on a set of displacement maps and a plurality of vectors (i.e. surface tension vectors), the trained neural network model may generate a displacement map for each tracked mesh. With availability of a displacement map for each tracked mesh, it may be possible to transfer the fine geometric details of a raw 3D scan onto a tracked mesh. Thus, the displacement maps produced by the trained neural network model may be applied to the acquired sequence of tracked meshes to update the sequence of tracked meshes with the fine geometric details included in the set of 3D scans. This may eliminate a need to manually extract and process the geometric details by using known software tools.

FIG. 1 is a block diagram that illustrates an exemplary network environment for preservation of geometry details in tracked meshes, in accordance with an embodiment of the disclosure. With reference to FIG. 1, there is shown a network environment 100. The network environment 100 may include an electronic device 102, a capture system 104, a first imaging device 106, a second imaging device 108, and a server 110. The network environment 100 may further include a communication network 112 and a neural network model 114. The network environment 100 may further include an object of interest, such as a person 116. The first imaging device 106 may capture a first sequence of image frames 118 associated with the person 116 and the second imaging device 108 may capture a second sequence of image frames 120 associated with the person 116.

The electronic device 102 may include suitable logic, circuitry, and interfaces that may be configured to acquire a set of three-dimensional (3D) scans of an object of interest and a sequence of tracked meshes of the object of interest. It may be assumed that the set of 3D scans (also referred to as a four dimensional (4D) scan) are high-quality raw scans and the sequence of tracked meshes (also referred to as a 4D-tracked mesh) may be low-quality tracked meshes. The electronic device 102 may transfer fine geometric details from high-quality raw scans (i.e. the set of 3D scans) to low-quality tracked meshes (i.e. the sequence of tracked meshes). While the high-quality raw scans may be acquired from the first imaging device 106, the low-quality tracked meshes may be acquired from images captured through the second imaging device. The quality of raw scans and the tracked meshes may depend on factors, such as a polycount. Examples of the electronic device 102 may include, but are not limited to, a computing device, a smartphone, a cellular phone, a mobile phone, a gaming device, a mainframe machine, a server, a computer workstation, and/or a consumer electronic (CE) device.

The capture system 104 may include suitable logic, circuitry, and interfaces that may be configured to control one or more imaging devices, such as the first imaging device 106 and the second imaging device 108 to capture one or more image sequences of the object of interest from one or more viewpoints. All the imaging devices, including the first imaging device 106 and the second image device 108 may be time-synchronized. In other words, each of such imaging devices may be trigged nearly or exactly at the same time to capture an image. Thus, a temporal correspondence may exist between frames which may be captured at the same time-instant by two or more imaging devices.

In an embodiment, the capture system 104 may include a dome-shaped lighting rig with enough space to include the person 116 or at least a face portion of the person 116. The first imaging device 106 and the second imaging device 108 may be mounted at specific positions on the dome-shaped lighting rig.

The first imaging device 106 may include suitable logic, circuitry, and interfaces that may be configured to capture the first sequence of image frames 118 associated with the object of interest (such as the person 116) in a dynamic state. The dynamic state may imply that the object of interest or at least one part of the object of interest is in motion. In an embodiment, the first imaging device 106 may be a digital still camera that may capture still images at a higher resolution than most high frame rate video cameras. In another embodiment, the first imaging device 106 may be a video camera that may capture a set of still image frames of the object of interest at a higher resolution and a lower-frame rate as compared to a high frame rate and low resolution video camera.

The second imaging device 108 may include suitable logic, circuitry, and interfaces that may be configured to capture the second sequence of image frames 120 associated with the object of interest (such as the person 116) in the dynamic state. In accordance with an embodiment, the first imaging device 106 may capture the first sequence of image frames 118 at a frame rate that may be less than a frame rate at which the second imaging device 108 may capture the second sequence of image frames 120. The image resolution of each frame in the first sequence of image frames 118 may be greater than an image resolution of each frame of the second sequence of image frames 120. Examples of the second imaging device 108 may include, but are not limited to, a video camera, an image sensor, a wide-angle camera, an action camera, a digital camera, a camcorder, a camera phone, a time-of-flight camera (ToF camera), and/or other image-capture devices.

The server 110 may include suitable logic, circuitry, and interfaces, and/or code that may be configured to generate a set of 3D scans 122 and a sequence of tracked meshes 124, based on the first sequence of image frames 118 and the second sequence of image frames 120, respectively. In an exemplary implementation, the server 110 may host a 3D modeling application, a graphics engine, and a 3D animation application. Such applications may include features, such as 3D mesh tracking and photogrammetry. The server 110 may receive the first sequence of image frames 118 to generate the set of 3D scans 122 and may receive the second sequence of image frames 120 to generate the sequence of tracked meshes 124. The server 110 may execute operations through web applications, cloud applications, HTTP requests, repository operations, file transfer, and the like. Example implementations of the server 110 may include, but are not limited to, a database server, a file server, a web server, a media server, an application server, a mainframe server, or a cloud computing server.

In at least one embodiment, the server 110 may be implemented as a plurality of distributed cloud-based resources by use of several technologies that are well known to those ordinarily skilled in the art. A person with ordinary skill in the art will understand that the scope of the disclosure may not be limited to the implementation of the server 110 and electronic device 102 as two separate entities. In certain embodiments, the functionalities of the server 110 may be incorporated in its entirety or at least partially in the electronic device 102, without a departure from the scope of the disclosure.

The communication network 112 may include a communication medium through which the electronic device 102, the capture system 104 and the server 110 may communicate with each other. The communication network 112 may be one of a wired connection or a wireless connection. Examples of the communication network 112 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The neural network model 114 may be a computational network or a system of artificial neurons or nodes, which may be arranged in a plurality of layers. The plurality of layers of the neural network model 114 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model 114. Outputs of each hidden layer may be coupled to inputs of at least one node in other layers of the neural network model 114. Node(s) in the final layer may receive inputs from at least one hidden layer to output a result. The number of layers and the number of nodes in each layer may be determined from hyper-parameters of the neural network model 114. Such hyper-parameters may be set before, while training, or after training the neural network on a training dataset.

Each node of the neural network model 114 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network model 114. All or some of the nodes of the neural network model 114 may correspond to same or a different mathematical function.

In training of the neural network model 114, one or more parameters of each node of the neural network model 114 may be updated based on whether an output (such as a displacement map) of the final layer for a given input from the training dataset (such as a vector associated with surface tension values) matches a correct result based on a loss function for the neural network model 114. The above process may be repeated for same or a different input till a minima of the loss function is achieved, and a training error may be minimized. Several methods for training are known in art, for example, gradient descent, stochastic gradient descent, batch gradient descent, gradient boost, meta-heuristics, and the like.

The neural network model 114 may include electronic data, which may be implemented as, for example, a software component of an application executable on the electronic device 102. The neural network model 114 may rely on libraries, external scripts, or other logic/instructions for execution by a processing device, such as the electronic device 102. The neural network model 114 may include code and routines that enable a computing device, such as the electronic device 102 to perform one or more operations. For example, such operations may be related to generation of a plurality of displacement maps from a given surface tension vector associated with mesh vertices. For this example, the neural network model 114 may be referred to as a vector-to-image function. Additionally, or alternatively, the neural network model 114 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model 114 may be implemented using a combination of both hardware and software.

Examples of the neural network model 114 may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the learning engine may include numerical computation techniques using data flow graphs. In certain embodiments, the neural network model 114 may be based on a hybrid architecture of multiple Deep Neural Networks (DNNs).

Each 3D scan of the set of 3D scans 122 may be a high-res raw 3D mesh that may include a plurality of polygons, such as triangles. Each 3D scan may correspond to a particular time instant and may capture a 3D shape/geometry of the object of interest at the particular time instant. For example, if the person 116 changes his/her face expression from a neutral expression to another expression within a duration of three seconds, then the set of 3D scans 122 may capture the 3D shape/geometric details associated with the face expression at different time instants within the duration. The set of 3D scans 122 may be acquired based on the first sequence of image frames 118. Such frames may be captured by the first imaging device 106 (such as a digital still camera).

The sequence of tracked meshes 124 may be a 4D mesh which captures dynamic changes to a 3D mesh over several discrete time-instants. The sequence of tracked meshes 124 may be acquired from a video (such as the second sequence of image frames 118) by using a suitable mesh tracking software and a parametric 3D model of the object of interest.

In operation, the electronic device 102 may synchronize the first imaging device 106 (such as a digital still camera) with the second imaging device 108 (such as a video camera). After the synchronization, the electronic device 102 may control the first imaging device 106 to capture the first sequence of image frames 118 of the object of interest, such as the person 116. Similarly, the electronic device 102 may control the second imaging device 108 to capture the second sequence of image frames 120 of the object of interest. While both the first imaging device 106 and the second imaging device 108 are controlled, the object of interest may be assumed to be in a dynamic state. The dynamic state may correspond to a state where at least a part of the object of interest or the entire object is in motion. For example, if the object of interest in an animate object, then the dynamic state may correspond to articulate or inarticulate movement of body parts, including but not limited to, bone joints, clothes, eyes, facial changes (in relation to changes in a face expression), head hair, or other body parts. The synchronization may enable the first sequence of image frames 118 and the second sequence of image frames 120 to be temporally aligned.

In accordance with an embodiment, the first imaging device 106 may capture the first sequence of image frames 118 at a frame rate that may be less than a frame rate at which the second imaging device 108 may capture the second sequence of image frames 120. The image resolution of an image frame in the first sequence of image frames 118 may be greater than that of an image frame in the second sequence of image frames 120. Details related to the capture of the first sequence of image frames 118 and the second sequence of image frames 120 are further provided, for example, in FIG. 3A.

The electronic device 102 may acquire the set of 3D scans 122 of the object of interest, such as the person 116. The set of 3D scans 122 may be acquired from the server 110 or may be generated locally. In an embodiment, the electronic device 102 may be configured to execute a first set of operations, including a photogrammetry operation to acquire the set of 3D scans 122. The execution of such operations may be based on the first sequence of image frames 118. Details of the acquisition of the set of 3D scans 122 are further provided for example in FIG. 3A.

The electronic device 102 may further acquire the sequence of tracked meshes 124 of the object of interest (such as a head/face of the person 116). The acquired sequence of tracked meshes 124 may include a set of tracked meshes which may temporally correspond to the acquired set of 3D scans 122. The temporal correspondence may exist due to the synchronization of the two imaging devices (i.e. the first imaging device 106 and the second imaging device 108). Such correspondence may only exist for the set of tracked meshes as the first sequence of image frames 118 may be captured at a relatively lower frame rate (but at higher resolution) as compared to the second sequence of image frames 120.

The electronic device 102 may acquire the sequence of tracked meshes 124 of the object of interest from the server 110 or may generate the sequence of tracked meshes 124 locally. In accordance with an embodiment, the electronic device 102 may be configured to execute a second set of operations, including a mesh-tracking operation to acquire the sequence of tracked meshes 124. The execution may be based on the captured second sequence of image frames 120 and a parametric 3D model of the object of interest. Details of the acquisition of the sequence of tracked meshes 124 are further provided for example in FIG. 3A.

Based on differences between the set of tracked meshes and the acquired set of 3D scans 122, the electronic device 102 may generate a set of displacement maps. For example, the electronic device 102 may determine a difference between 3D coordinates of mesh vertices of each tracked mesh of the set of tracked meshes and corresponding 3D coordinates of mesh vertices of a respective 3D scan of the set of 3D scans 122. Details of the generation of the set of displacement maps are further provided for example in FIG. 4.

The electronic device 102 may compute a plurality of vectors, each of which may include surface tension values associated with the mesh vertices of a corresponding tracked mesh of the sequence of tracked meshes 124. All the surface tension values may be flattened to a 1-Dimensional array to obtain a 1-D vector of surface tension values. In accordance with an embodiment, the surface tension values may be determined based on comparison of reference values of mesh vertices of one or more first tracked meshes of the sequence of tracked meshes 124 with that of corresponding mesh vertices of one or more second tracked meshes of the sequence of tracked meshes 124. While the one or more first tracked meshes may be associated with a neutral face expression, the one or more second tracked meshes may be associated with a face expression different from the neutral face expression. By way of example, and not limitation, a tracked mesh of a face or a head portion may represent a smiling face expression. In comparison to a tracked mesh of a neutral face, the tracked mesh may include regions which appear stretched and squeezed (for example, cheeks and lips). The reference values of mesh vertices for a neutral face expression may be set to zero (which represents zero surface tension values). If any mesh vertex is stretched or squeezed for any face expression different from the neutral face expression, then the surface tension value for such mesh vertex may be set to a float value between −1 and +1. Details of the computation of the plurality of vectors are further provided for example in FIG. 5.

Based on the computed set of displacement maps and a corresponding set of vectors of the computed plurality of vectors, the neural network model 114 may be trained on a task of displacement map generation. In accordance with an embodiment, the electronic device 102 may construct a training dataset to include pairs of input-output values. Each pair of the input-output values may include a vector of the computed set of vectors and a displacement map of the generated set of displacement maps. While the vector may be provided as an input to the neural network model 114 for the training, the displacement map may be used as a ground truth for an output of the neural network model 114. Details of the training of the neural network model 114 are further provided for example in FIG. 6.

Once trained, the electronic device 102 may apply the trained neural network model 114 on the computed plurality of vectors to generate a plurality of displacement maps. Each vector may be provided as input to the trained neural network model 114 at a time to generate a corresponding displacement map as an output of the trained neural network model 114 for the input vector. The trained neural network model 114 may help to predict missing displacement maps, initially not available due to a difference in number of 3D scans (high-resolution) and the number of tracked meshes (low-poly but more in number). Thus, after the application of the trained neural network model 114, a one-to-one correspondence may exist between the plurality of displacement maps and the sequence of tracked meshes 124. Details of the generation of the plurality of displacement maps are further provided for example in FIG. 7.

Based on a corresponding displacement map of the generated plurality of displacement maps, the electronic device 102 may update each tracked mesh of the acquired sequence of tracked meshes 124. This update may yield a sequence of high-quality, high-frame-rate tracked meshes. With availability of a displacement map for each tracked mesh, it may be possible to transfer the fine geometric details of a (raw) 3D scan onto a tracked mesh. Thus, the displacement maps produced by the trained neural network model 114 may be applied to the acquired sequence of tracked meshes 124 to update the sequence of tracked meshes 124 with fine geometric details included in the set of 3D scans. This may eliminate a need to manually extract and process the geometric details by using known software tools. Details of the update of the acquired sequence of tracked meshes 124 are further provided, for example, in FIG. 8.

Figure 2:
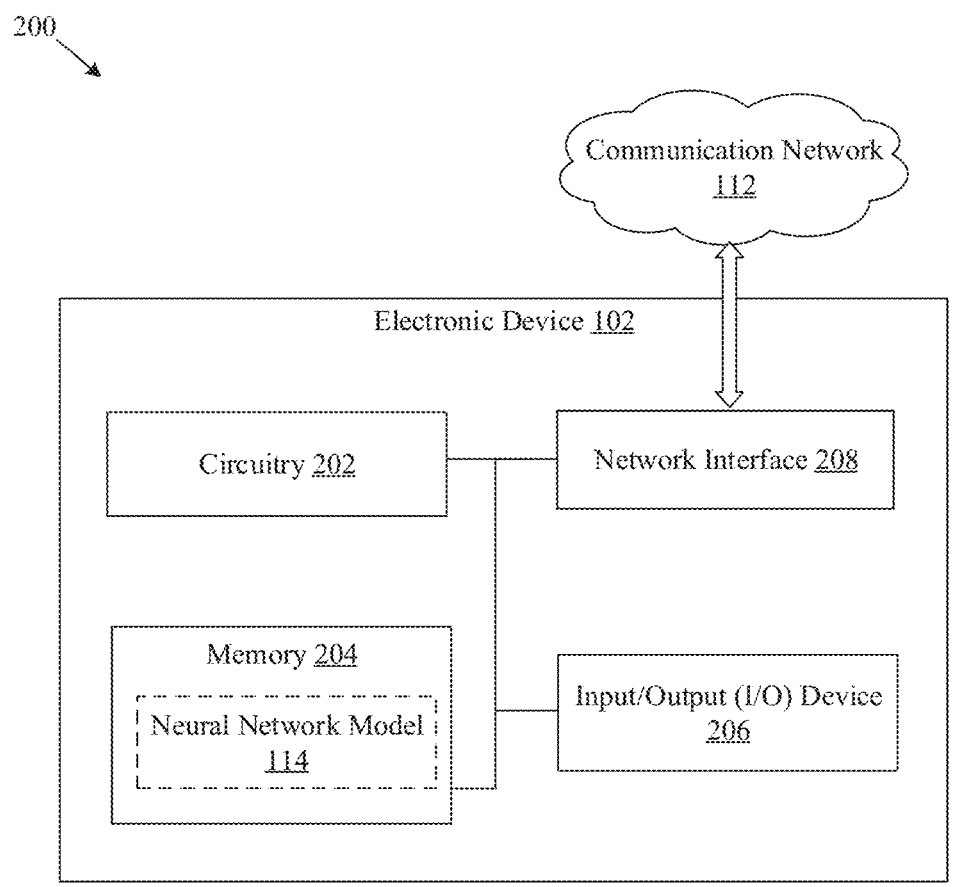
FIG. 2 is a block diagram that illustrates an exemplary electronic device for preserving geometry in tracked meshes, in accordance with an embodiment of the disclosure.

FIG. 2 is a block diagram that illustrates an exemplary electronic device for preserving geometry in tracked meshes, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an Input/Output (I/O) device 206, and a network interface 208. The circuitry 202 may be communicatively coupled to the memory 204, the I/O device 206, and the network interface 208. In some embodiments, the memory 204 may include the neural network model 114.

The circuitry 202 may include suitable logic, circuitry, and interfaces that may be configured to execute program instructions associated with different operations to be executed by the electronic device 102. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, and interfaces that may be configured to store the program instructions to be executed by the circuitry 202. The memory 204 may be configured to store the neural network model 114. The memory 204 may be also configured to store the set of 3D scans 122, the sequence of tracked meshes 124, the plurality of displacement maps, the plurality of vectors and the updated sequence of tracked meshes. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input from a user and provide an output based on the received input. The I/O device 206 which may include various input and output devices, may be configured to communicate with the circuitry 202. For example, the electronic device 102 may receive a user input via the I/O device 206 to acquire the set of 3D scans 122 and the sequence of tracked meshes 124 from the server 110. The I/O device 206, such as a display may render the updated sequence of tracked meshes. Examples of the I/O device 206 may include, but are not limited to, a touch screen, a display device, a keyboard, a mouse, a joystick, a microphone, and a speaker.

The network interface 208 may include suitable logic, circuitry, and interfaces that may be configured to facilitate communication between the circuitry 202, the capture system 104 and the server 110 via the communication network 112. The network interface 208 may be implemented by use of various known technologies to support wired or wireless communication of the electronic device 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5G NR, code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the electronic device 102, as described in FIG. 1, may be performed by the circuitry 202. Operations executed by the circuitry 202 are described in detail, for example, in FIGS. 4A, 4B, 5, 6, 7 and 8.

Figure 3A:
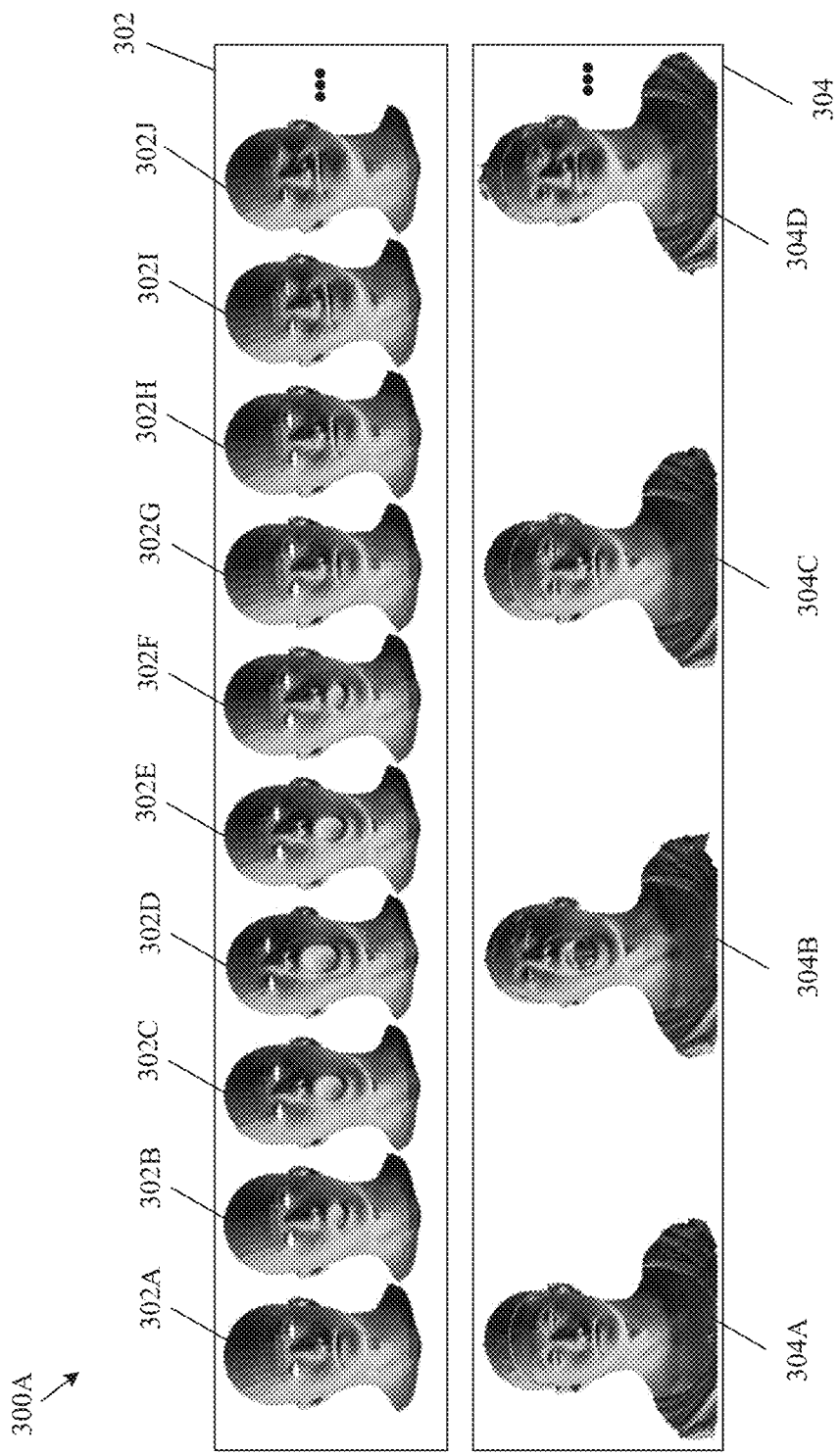
FIG. 3A is a diagram that illustrates an exemplary set of three-dimensional (3D) scans and tracked meshes of a face or head portion, in accordance with an embodiment of the disclosure.

FIG. 3A is a diagram that illustrates an exemplary set of three-dimensional (3D) scans and tracked meshes of a face or head portion, in accordance with an embodiment of the disclosure. FIG. 3A is explained in conjunction with elements from FIG. 1 and FIG. 2. With reference to FIG. 3A, there is shown a diagram 300A that illustrates an exemplary sequence of tracked meshes 302 and a set of 3D scans 304. The operations to acquire both the sequence of tracked meshes 302 and the set of 3D scans 304 is described herein.

The circuitry 202 may be configured to synchronize the first imaging device 106 (such as a digital still camera) with the second imaging device 108 (such as a video camera). The first imaging device 106 and the second imaging device 108 may be temporally synchronized such that both the first imaging device 106 and the second imaging device 108 are trigged to capture frames at common time-instants. After the synchronization, the circuitry 202 may be configured to control the first imaging device 106 to capture the first sequence of image frames 118 of the object of interest (in a dynamic state). The circuitry 202 may further control the second imaging device 108 to capture the second sequence of image frames 120 of the object of interest (in the dynamic state). As shown, for example, the object of interest may be a face portion of the person 116. The dynamic state of the object of interest may correspond to changes in a facial expression of the person 116 over time.

In accordance with an embodiment, the first imaging device 106 may capture the first sequence of image frames 118 at a frame rate that may be less than a frame rate at which the second imaging device 108 may capture the second sequence of image frames 120. For example, the frame rate at which the first imaging device 106 may capture the first sequence of image frames 118 may be 10 frame per second. The frame rate at which the second imaging device 108 may capture the second sequence of image frames 120 may be 30 frames per second. In such a case, few images of the second sequence of image frames 120 may be captured at the same time the first sequence of image frames 118 is captured. Whereas, for rest of the images in the second sequence of image frames 120, there may be no corresponding image in the first sequence of image frames 118.

In accordance with an embodiment, an image resolution of each of the first sequence of image frames 118 may be greater than an image resolution of each image frame of the second sequence of image frames 120. Each of the first sequence of image frames 118 captured by the first imaging device 106 (such as the digital still camera) may include fine geometric details, such as related to skin geometry or microgeometry of the face portion, facial hair on the face portion of the person 116, pores on the face portion of the person 116, and other facial features of the person 116.

In accordance with an embodiment, the circuitry 202 may be configured to execute a first set of operations including a photogrammetry operation to acquire the set of 3D scans 304. The execution may be based on the captured first sequence of image frames 118. The set of 3D scans 304 may include, for example, a 3D scan 304A, a 3D scan 304B, a 3D scan 304C, and a 3D scan 304D. The first set of operations may include a correspondence search of relevant images from the first sequence of image frames 118 for the acquisition of the set of 3D scans 304. Based on the correspondence search, the circuitry 202 may detect overlapping areas in the relevant images from the first sequence of image frames 118. Such areas may be eliminated from the first sequence of image frames 118.

The photogrammetry operation may include feature extraction from the first sequence of image frames 118. For example, location of coded markers in the first sequence of image frames 118 may be utilized for the feature extraction. The photogrammetry operation may further include triangulation. The triangulation may provide 3D coordinates of the mesh vertices of each 3D scan (such as the 3D scan 304A) of the set of 3D scans 304. The first set of operations may further include a post-processing of the 3D scans obtained from triangulation to acquire the set of 3D scans 304. For example, the post-processing of the 3D scans may include a removal of floating artifacts, background noise, holes, and irregularities from the 3D scans.

In accordance with an embodiment, the circuitry 202 may be further configured to execute a second set of operations including a mesh-tracking operation to acquire the sequence of tracked meshes 302. The execution may be based on the captured second sequence of image frames 120 and a 3D parametric model of the object of interest (which is the face or head portion, for example). The sequence of tracked meshes 302 may include a tracked mesh 302A, a tracked mesh 302B, a tracked mesh 302C, a tracked mesh 302D, a tracked mesh 302E, a tracked mesh 302F, a tracked mesh 302G, a tracked mesh 302H, a tracked mesh 302I, and a tracked mesh 302J.

The second set of operations may include an operation to recover geometry and motion information (across frames) from the second sequence of image frames 120. The recovered geometry and motion information may be used by a mesh tracking tool to deform a parametric 3D model of the object of interest (which is the face or head portion) so as to produce a sequence of tracked meshes 302 (also referred to a 4D tracked mesh). The second set of operations may also include a post-processing of the sequence of tracked meshes 302 for removal of the floating artifacts, the background noise, the holes, and the irregularities from the sequence of tracked meshes 302.

In an exemplary embodiment, the tracked mesh 302A may temporally correspond to the 3D scan 304A, the tracked mesh 302D may temporally correspond to the 3D scan 304B, the tracked mesh 302G may temporally correspond to the 3D scan 304C, and the tracked mesh 302J may temporally correspond to the 3D scan 304D. Thus, a set of tracked meshes which temporally corresponds to the acquired set of 3D scans 304 include the tracked mesh 302A, the tracked mesh 302D, the tracked mesh 302G and the tracked mesh 302J. In accordance with an embodiment, the polycount of each tracked mesh of the acquired sequence of tracked meshes 302 may be less than a polycount in each 3D scan of the acquired set of 3D scans 304. In other words, the acquired set of 3D scans 304 may be high-quality scans that may capture the intricate or fine geometric details of the face portion of the person 116.

Figure 3B:
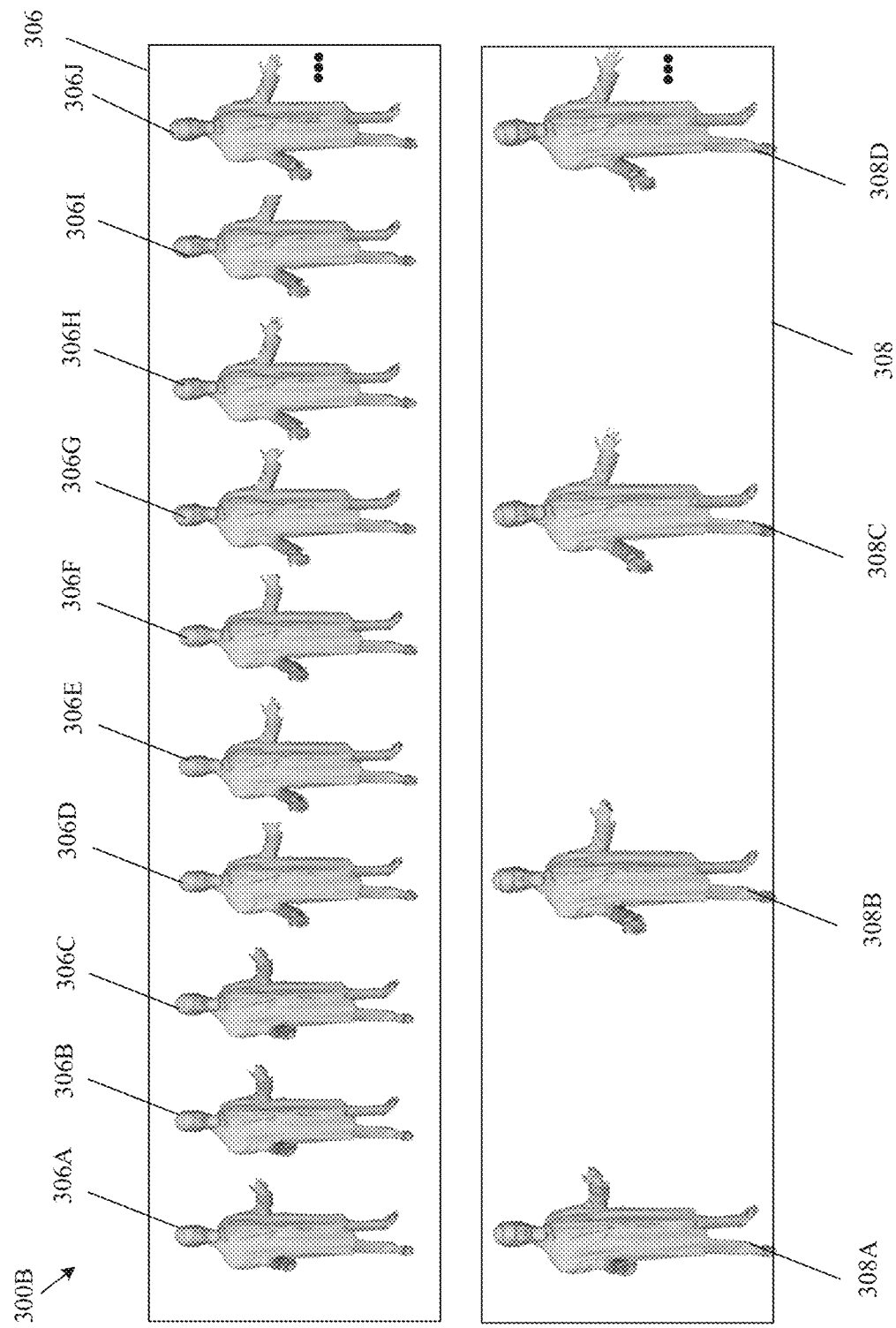
FIG. 3B is a diagram that illustrates an exemplary set of three-dimensional (3D) scans and tracked meshes of a full body with clothes, in accordance with an embodiment of the disclosure.

FIG. 3B is a diagram that illustrates an exemplary set of three-dimensional (3D) scans and tracked meshes of a full body with clothes, in accordance with an embodiment of the disclosure. FIG. 3B is explained in conjunction with elements from FIGS. 1, 2, and 3A. With reference to FIG. 3B, there is shown a diagram 300B that illustrates a sequence of tracked meshes 306 and a set of 3D scans 308 of a full body with clothes.

The circuitry 202 may capture the first sequence of image frames 118 associated with the person 116 and may acquire the set of 3D scans 308 based on execution of the first set of operations including the photogrammetry operation. The set of 3D scans 308 may include a 3D scan 308A, a 3D scan 308B, a 3D scan 308C and a 3D scan 308D. Similarly, the circuitry 202 may further capture the second sequence of image frames 120 of the person 116 and may acquire the sequence of tracked meshes 306 based on execution of the second set of operations including, but not limited to, a mesh-tracking operation. The sequence of tracked meshes 306 may include a tracked mesh 306A, a tracked mesh 306B, a tracked mesh 306C, a tracked mesh 306D, a tracked mesh 306E, a tracked mesh 306F, a tracked mesh 306G, a tracked mesh 306H, a tracked mesh 306I, and a tracked mesh 306J. As shown, the tracked mesh 306A may temporally correspond to the 3D scan 308A, the tracked mesh 306D may temporally correspond to the 3D scan 308B, the tracked mesh 306G may temporally correspond to the 3D scan 308C, and the tracked mesh 306J may temporally correspond to the 3D scan 308D.

Figure 4A:
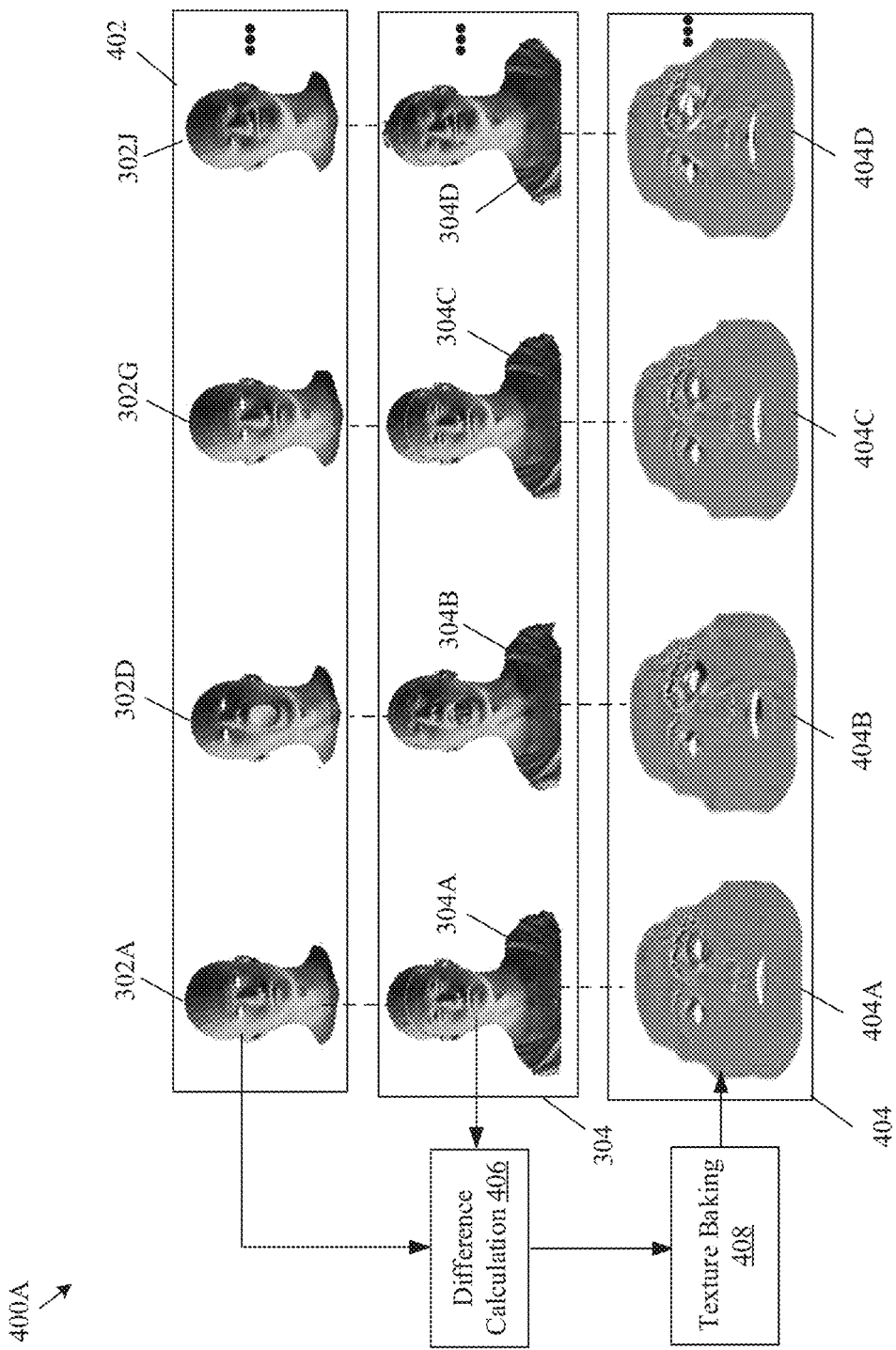
FIG. 4A is a diagram that illustrates operations to generate displacement maps, in accordance with an embodiment of the disclosure.

FIG. 4A is a diagram that illustrates operations to generate displacement maps, in accordance with an embodiment of the disclosure. FIG. 4A is explained in conjunction with elements from FIGS. 1, 2, 3A, and 3B. With reference to FIG. 4A, there is shown a diagram 400A that illustrates operations for generation of the set of displacement maps.

At 406, a difference calculation may be performed. the circuitry 202 may calculate differences between a set of tracked meshes 402 and the acquired set of 3D scans 304. The differences may be calculated in a pairwise manner between a tracked mesh and a 3D scan. The set of tracked meshes 402 may include the tracked mesh 302A that may temporally correspond to the 3D scan 304A. Similarly, the tracked mesh 306D may temporally correspond to the 3D scan 304B, the tracked mesh 302G may temporally correspond to the 3D scan 304C, and the tracked mesh 302J may temporally correspond to the 3D scan 304D. Details of the calculation of the differences are further provided for example in FIG. 4B.

At 408, a texture baking operation may be performed. The circuitry 202 may bake the calculated difference in texture between a tracked mesh of the set of tracked meshes 402 and a corresponding 3D scan of the 3D scans 304. The difference may be baked by using UV coordinates of each mesh vertex of the tracked mesh. All the tracked meshes have the same UV coordinates. Based on the baking operation, the circuitry 202 may generate a set of displacement maps 404. Specifically, for each pair of a tracked mesh and a corresponding 3D scan, the operations at 406 and 408 may yield a displacement map (which is 3-channel image), which stores XYZ displacement of vertices in RGB image channels. As shown, for example, the set of displacement maps 404 include a displacement map 404A corresponding to the tracked mesh 302A, a displacement map 404B corresponding to the tracked mesh 302D, a displacement map 404C corresponding to the tracked mesh 302G, and a displacement map 404D corresponding to the tracked mesh 302J. Because the UV coordinates are all same for every frame, displacements of a certain area, for example, an eye region of the face may always be stored in the same area of the displacement map.

The diagram 400A is illustrated with discrete operations, such as 406 and 408. In certain embodiments, such discrete operations may be further divided into additional operations, combined into fewer operations, or eliminated, depending on the particular implementation without detracting from the essence of the disclosed embodiments.

Figure 4B:
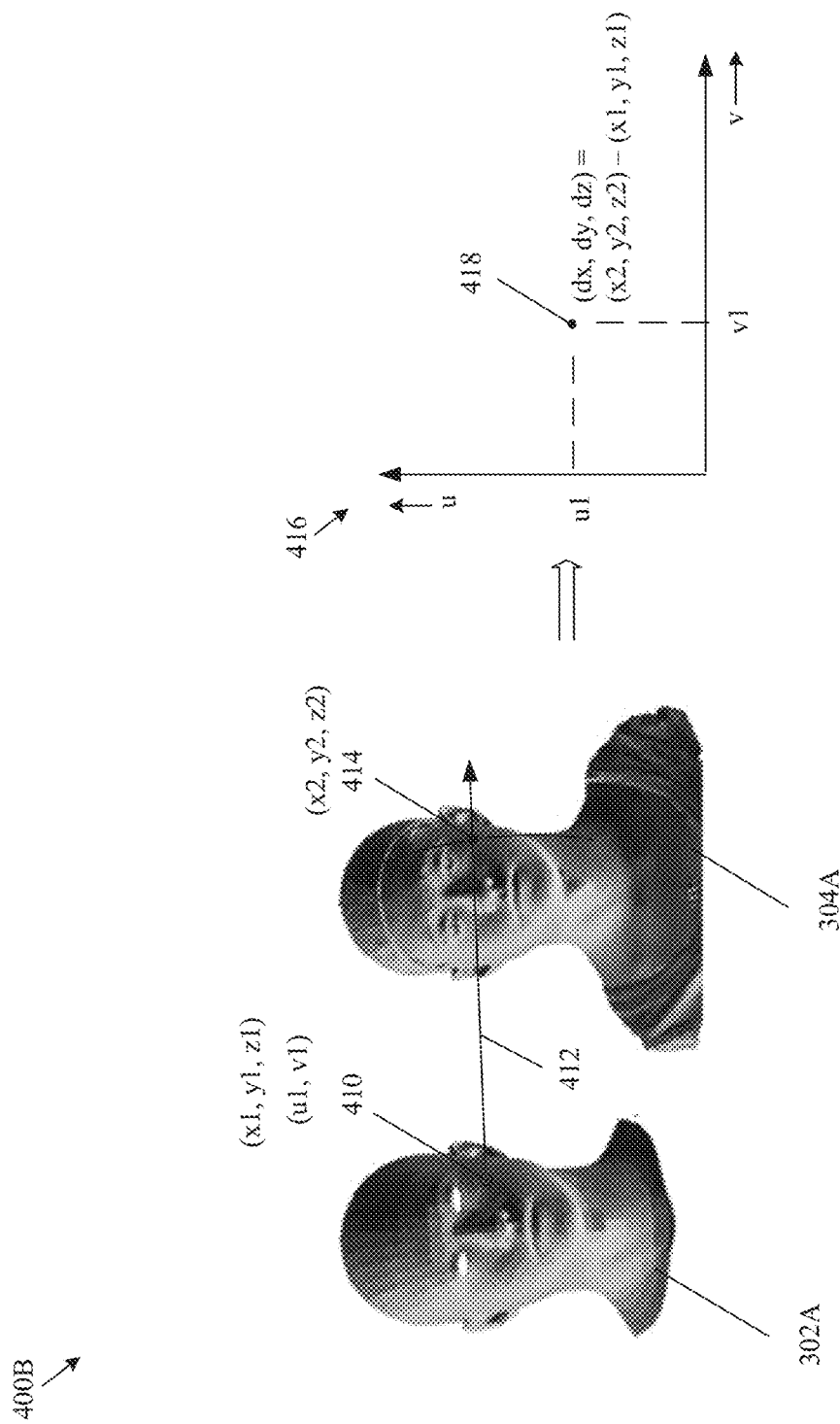
FIG. 4B is a diagram that illustrates operations to calculate differences between a tracked mesh and a 3D scan, in accordance with an embodiment of the disclosure.

FIG. 4B is a diagram that illustrates operations to calculate differences between a tracked mesh and a 3D scan, in accordance with an embodiment of the disclosure. FIG. 4B is explained in conjunction with elements from FIGS. 1, 2, 3A, 3B, and 4A. With reference to FIG. 4B, there is shown a diagram 400B that includes the tracked mesh 302A and the 3D scan 304A. The tracked mesh 302A includes a plurality of mesh vertices. The 3D coordinates of a first mesh vertex 410 of the tracked mesh 302A may be x1, y1 and z1. The UV coordinates of the first mesh vertex 410 of the tracked mesh 302A may be u1 and v1. A surface normal vector 412 may be drawn from the first mesh vertex 410 to the corresponding 3D scan 304A. Since the polycount of the 3D scan 304A is more than that of the tracked mesh 302A, a one-to-one correspondence may have to be established to determine mesh vertices of the 3D scan 304A that correspond to mesh vertices of the tracked mesh 302A. For that, a surface normal vector 412 may be drawn from the first mesh vertex 410. The surface normal vector 412 may intersect with a first mesh vertex 414 of the 3D scan 304A. The 3D coordinates of the first mesh vertex 414 of the 3D scan 304A may be x2, y2 and z2.

The circuitry 202 may calculate the difference between 3D coordinates (x2, y2, z2) of the first mesh vertex 414 and the 3D coordinates (x1, y1, z1) of the first mesh vertex 410. A representation of the difference in UV space is provided in a graph representation 416. X-axis of the graph representation 416 may correspond to "u" coordinate of the UV coordinates, and a Y-axis of the graph representation 416 may correspond to "v" coordinate of the UV coordinates. The circuitry 202 may determine a resultant 3D coordinate 418 (represented by dx, dy, dz) at a position "u1, v1" in the graph 416. The resultant 3D coordinate 418 (represented by dx, dy, dz) may be derived by calculation of the difference between the 3D coordinates (x1, y1, z1) of the first mesh vertex 410 and the 3D coordinates (x2, y2, z2) of the first mesh vertex 414. Similarly, a resultant 3D coordinate for other mesh vertices of the tracked mesh 302A may be determined. The displacement map 404A may be generated based on the resultant 3D coordinates for the tracked mesh 302A.

Figure 5:
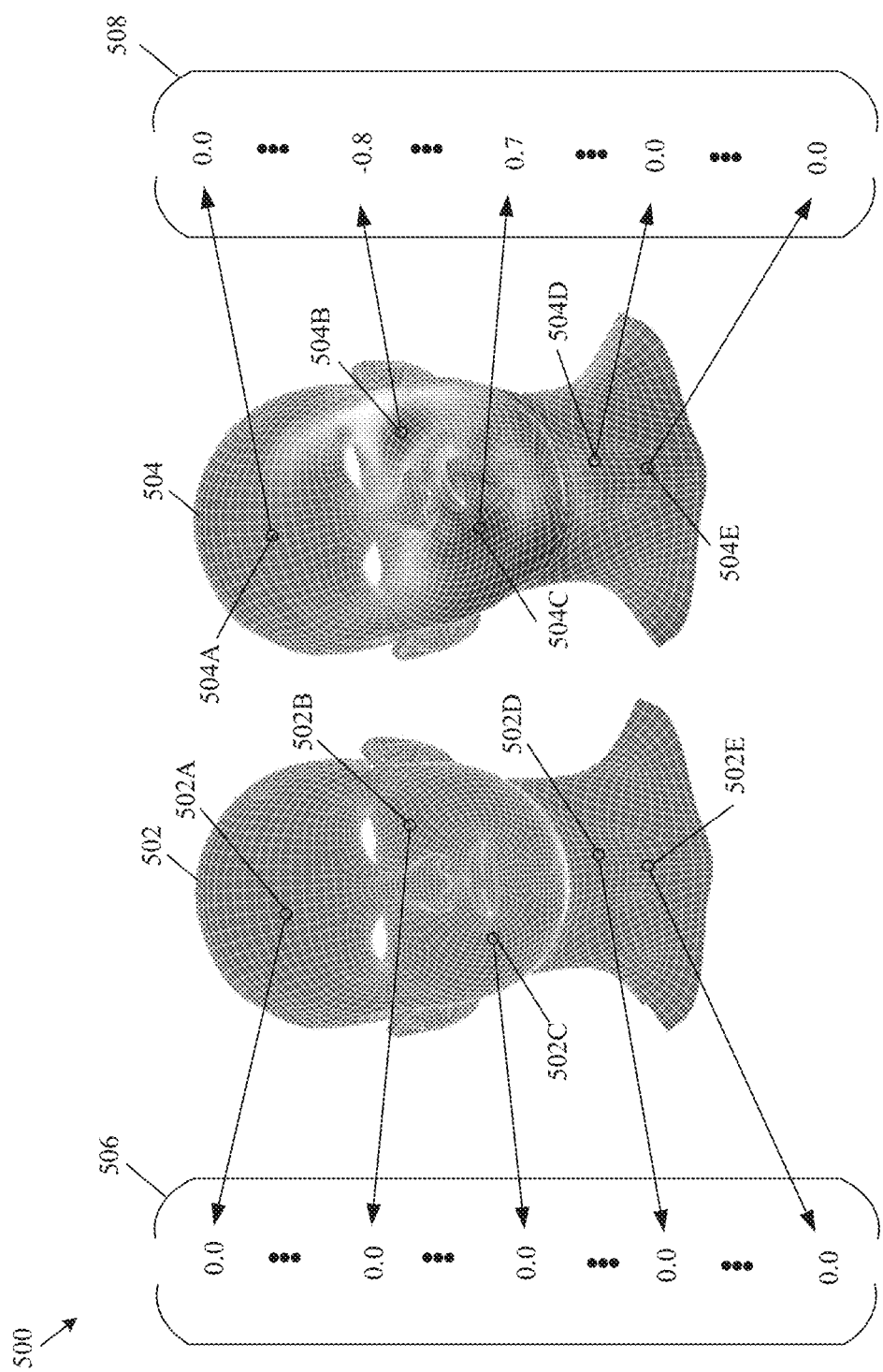
FIG. 5 is a diagram that illustrates computation of a plurality of vectors, in accordance with an embodiment of the disclosure.

FIG. 5 is a diagram that illustrates computation of a plurality of vectors, in accordance with an embodiment of the disclosure. FIG. 5 is explained in conjunction with elements from FIGS. 1, 2, 3A, 3B, 4A, and 4B. With reference to FIG. 5, there is shown a diagram 500 that includes a first tracked mesh 502 and a second tracked mesh 504 of the sequence of tracked meshes 302.

The circuitry 202 may be configured to compute a plurality of vectors, each of which may include surface tension values associated with mesh vertices of a corresponding tracked mesh of the sequence of tracked meshes 302. Typically, when a mesh deforms from a neutral state (such as neutral face expression) to another state (such as a different face expression), some areas or regions of the mesh may appear stretched or squeezed. As shown, for example, the stretched and squeezed areas are indicated by white color and black color, respectively. As an example, the face expression, such as an expression of anger, an expression of laughter, an expression of frown, and so forth may cause certain areas of the tracked mesh of the face to squeeze or stretch. The surface tension values associated with the mesh vertices of such a mesh may be calculated with respect to reference values for a mesh in a neutral state, such as a neutral face expression of a face or head mesh. If a sequence of tracked meshes is associated with a different body part (other than the head or the face), then the surface tension values may be determined from surface deformations observed in such meshes with respect to a neutral state of the mesh. For a non-face model, the neutral state may be defined in terms of a state of body posture, folds in cloth, hair position, skin or muscle deformation, joint locations or orientation, and the like.

In accordance with an embodiment, the circuitry 202 may determine one or more first tracked meshes of the sequence of tracked meshes 302 to be associated with a neutral face expression. For example, the first tracked mesh 502 of the sequence of tracked meshes 302 is shown to be associated with the neutral face expression. The circuitry 202 may be configured to further determine surface tension values associated with the mesh vertices of each of the determined one or more first tracked meshes as zero (0.0). The surface tension values of each mesh vertex, such as a mesh vertex 502A, a mesh vertex 502B, a mesh vertex 502C, a mesh vertex 502D and a mesh vertex 502E of the first tracked mesh 502 may be associated with the neutral face expression. After surface tension values are determined for all the mesh vertices, such values may be stacked into a column stack vector. This operation yields a reference vector 506 (which is also referred to as a surface tension vector). The circuitry 202 may generate the reference vector 506, based on the surface tension values (0.0).

In an embodiment, the circuitry 202 may further determine one or more second tracked meshes of the sequence of tracked meshes 302 to be associated with a face expression different from the neutral face expression. For example, the second tracked mesh 504 of the sequence of tracked meshes 302 is shown to be associated with a face expression different from the neutral face expression. The circuitry 202 may compare the mesh vertices of each of the determined one or more second tracked meshes with reference values of the mesh vertices for the neutral face expression. As an example, the mesh vertices, such as a mesh vertex 504A, a mesh vertex 504B, a mesh vertex 504C, a mesh vertex 504D, and a mesh vertex 504E of the second tracked mesh 504 may be compared with the corresponding reference values of the mesh vertices (such as the mesh vertex 502A, the mesh vertex 502B, the mesh vertex 502C, the mesh vertex 502D and the mesh vertex 502E) of the first tracked mesh 502.

Based on the comparison, the circuitry 202 may determine the surface tension values associated with the mesh vertices of each of the determined one or more second tracked meshes. For example, the surface tension values associated with the mesh vertices of the second tracked mesh 504 may be determined to be float values, each of which may lie within a range of −1.0 to 1.0. For example, the surface tension vale for a mesh vertex corresponding to a stretched area on the face portion may be a positive number between 0 and 1. The surface tension vale for a mesh vertex corresponding to a squeezed area on the face portion may be a negative number between 0 and −1.

In an exemplary scenario, the circuitry 202 may compare the reference value of the mesh vertex 502A of the first tracked mesh 502 with the corresponding mesh vertex 504A of the second tracked mesh 504. The surface tension value of the mesh vertex 504A may be determined as "0", based on a determination that the mesh vertex 504A is part of a neutral area (i.e. a forehead area which is neither stretched nor squeezed) of the second tracked mesh 504. The surface tension value of the mesh vertex 504B may be determined as "−0.8", based on a determination that the mesh vertex 504B belongs to a squeezed area of the second tracked mesh 504. The surface tension value of the mesh vertex 504C may be determined as "0.7", based on a determination that the mesh vertex 504C belongs to a stretched area of the second tracked mesh 504. Threshold values (or the reference values) may be used to determine if a mesh vertex is to be determined as one of stretched, squeezed, or neutral and the extent of a stretch or a squeeze. The above process may be repeated iteratively for all the remaining mesh vertices of the second tracked mesh 504 to determine the surface tension values for all the mesh vertices of the second tracked mesh 504. The circuitry 202 may compute a vector 508 associated with the second tracked mesh 504. The computed vector 508 may include the surface tension values in a column vector. Operations described in FIG. 5 may be repeated for each tracked mesh of the sequence of tracked meshes 302 to compute the plurality of vectors.

Figure 6:
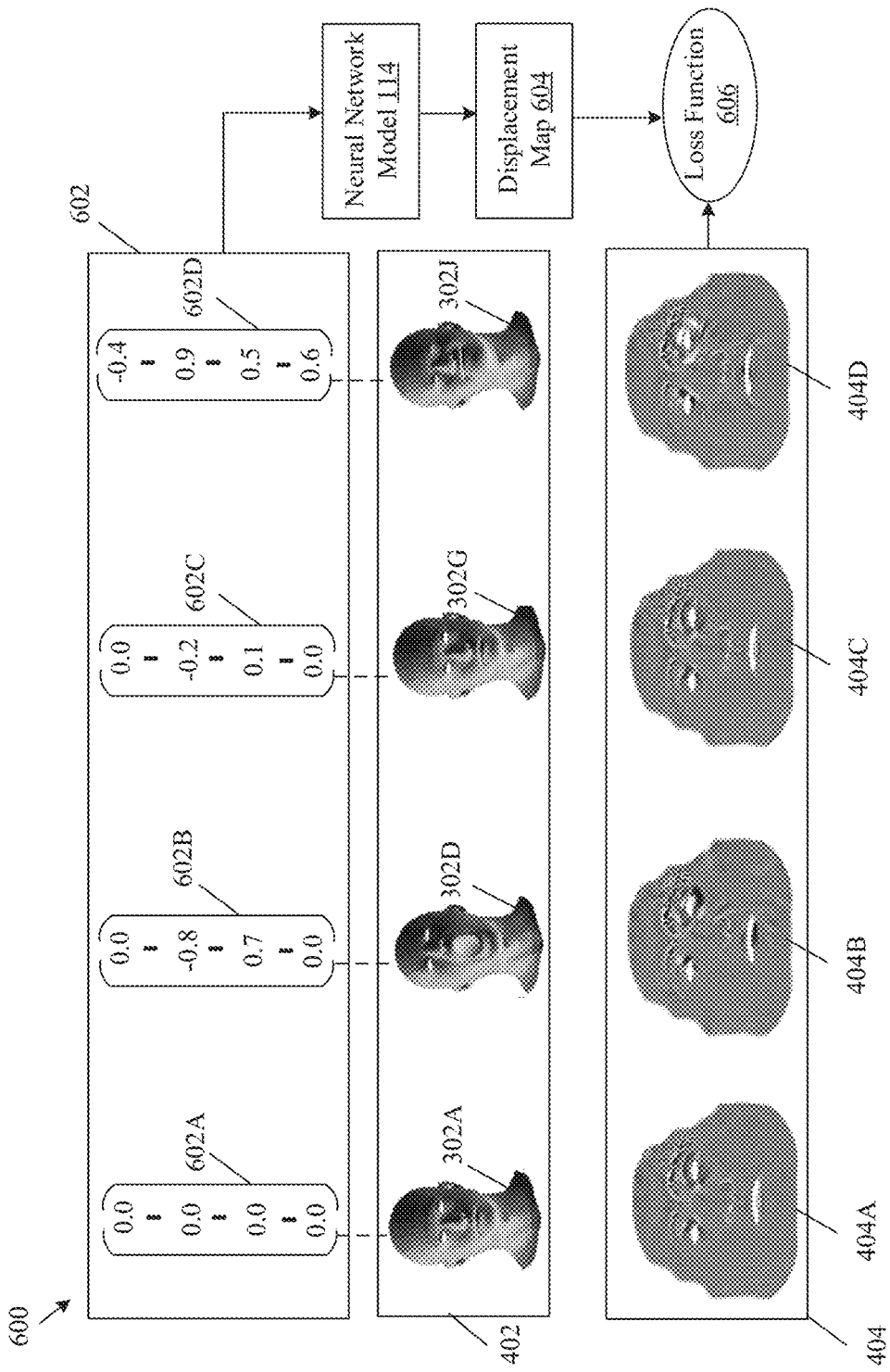
FIG. 6 is a diagram that illustrates training of a neural network model on a task of displacement map generation, in accordance with an embodiment of the disclosure.

FIG. 6 is a diagram that illustrates exemplary operations to train a neural network model on a task of displacement map generation, in accordance with an embodiment of the disclosure. FIG. 6 is explained in conjunction with elements from FIGS. 1, 2, 3A, 3B, 4A, 4B, and 5. With reference to FIG. 6, there is shown a diagram 600 that includes a set of vectors 602, a displacement map 604, and a loss function 606.

From FIGS. 3A-3B, 4, and 5, it can be observed that some tracked meshes have both vectors (i.e. surface tension vectors) and displacement maps and some tracked meshes have only vectors. An objective here is to generate displacement maps for those tracked meshes that do not have displacement maps. Such meshes are the ones for which no corresponding 3D scan exists. This happens because the set of 3D scans 304 may be acquired by using the first imaging device 106 (such as a digital still camera), which captures at a relatively lower frame rate than that of a video camera. In contrast, the sequence of tracked meshes 302 may be acquired by using the second imaging device 108 (such as a video camera), which captures at a relatively higher frame rate than that of a digital still camera. As a result, the sequence of tracked meshes 302 have a higher frame-rate, but a lower polycount in comparison to the set of 3D scans 304. To generate the displacement maps, a vector-to-image function in the form of the neural network model 114 may be trained, as described herein.

The circuitry 202 may be configured to train the neural network model 114 on a task of displacement map generation, based on the computed set of displacement maps 404 and the corresponding set of vectors 602 of the computed plurality of vectors. Before training, the circuitry 202 may construct a training dataset to include pairs of input-output values. Each pair of the pairs of input-output values may include a vector of the computed set of vectors 602 corresponding to the set of tracked meshes 402 as an input for the neural network model 114. The computed set of vectors 602 may be provided as the input to the neural network model 114 at the time of training. Each pair of the pairs of input-output values may further include a displacement map of the generated set of displacement maps 404 as a ground truth for an output of the neural network model 114. In each pass (i.e. a forward and backward pass), the neural network model 114 may be trained to output a displacement map (such as the displacement map 604), based on a vector of the set of vectors 602 as the input. The neural network model 114 may be trained for a number for epochs on the pairs of input-output values until a loss between the ground truth and the output of the neural network model 114 is below a threshold.

In an exemplary scenario, the set of vectors 602 may include a vector 602A corresponding to the tracked mesh 302A, a vector 602B corresponding to the tracked mesh 302D, a vector 602C corresponding to the tracked mesh 302G and a vector 602D corresponding to the tracked mesh 302J. Each vector of the set of vectors 602 may be input to the neural network model 114 one by one, to receive the output as the displacement map 604. For example, the displacement map 404A may be considered as the ground truth, when the vector 602A may be input to the neural network model 114. The circuitry 202 may determine the loss function 606, based on the comparison of the displacement map 404A and the received displacement map 604. The circuitry 202 may update the weights of the neural network model 114 when the loss function 606 may be above the threshold. After the update, the circuitry 202 may input the vector 602B to the neural network model 114. The circuitry 202 may determine the loss function 606, based on the comparison of the displacement map 404B and the received displacement map 604. Similarly, the circuitry 202 may train the neural network model 114 for the number for epochs on the pairs of input-output values, until the determined loss function 606 may be below the threshold.

Figure 7:
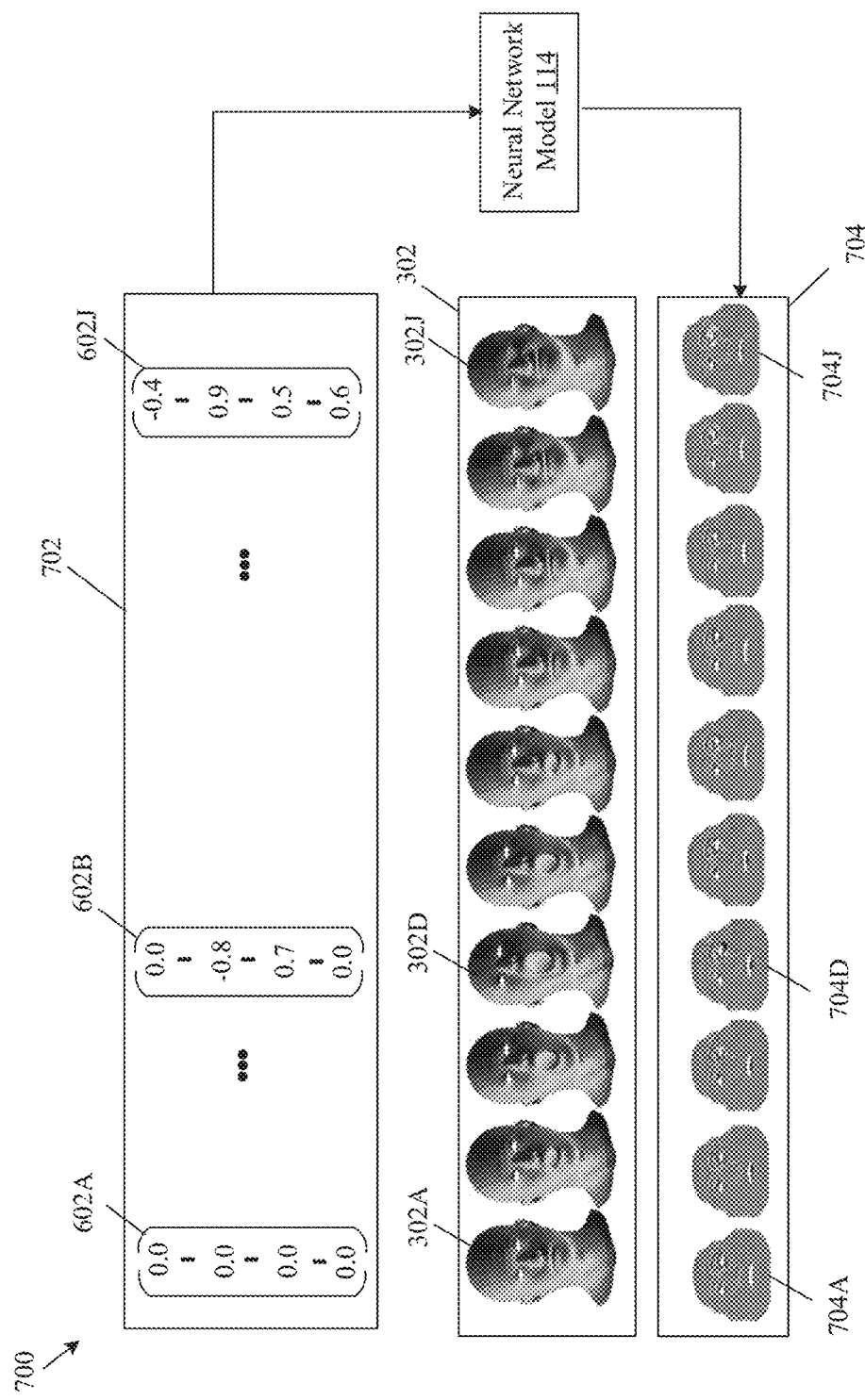
FIG. 7 is a diagram that illustrates generation of a plurality of displacement maps, in accordance with an embodiment of the disclosure.

FIG. 7 is a diagram that illustrates generation of a plurality of displacement maps, in accordance with an embodiment of the disclosure. FIG. 7 is explained in conjunction with elements from FIGS. 1, 2, 3A, 3B, 4A, 4B, 5, and 6. With reference to FIG. 7, there is shown a diagram 700 that includes a plurality of vectors 702 and a plurality of displacement maps 704. The circuitry 202 may be configured to apply the trained neural network model 114 on the computed plurality of vectors 702 to generate the plurality of displacement maps 704. The plurality of vectors 702 may include a vector corresponding to each tracked mesh of the sequence of tracked meshes 302. The trained neural network model 114 may be applied to each vector, such as the vector 602A corresponding to the tracked mesh 302A, the vector 602B corresponding to the tracked mesh 302D and a vector 602J corresponding to the tracked mesh 302J of the sequence of tracked meshes 302. As a result of the application, the trained neural network model 114 may generate the plurality of displacement maps 704, such as a displacement map 704A corresponding to the tracked mesh 302A, a displacement map 704D corresponding to the tracked mesh 302D, and a displacement map 704J corresponding to the tracked mesh 302J.

Figure 8:
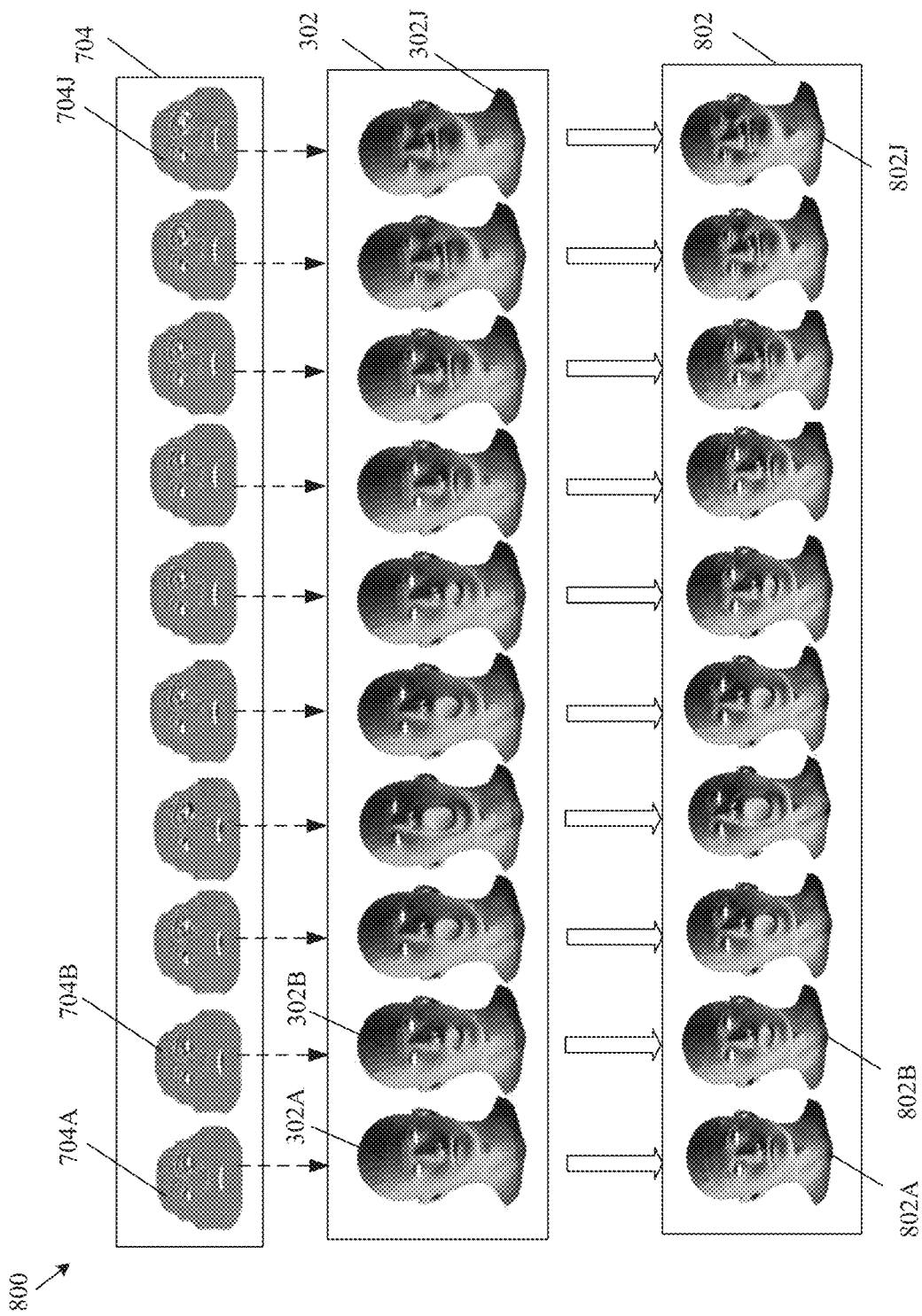
FIG. 8 is a diagram that illustrates operations to update a sequence of tracked meshes based on displacement maps generated in FIG. 7, in accordance with an embodiment of the disclosure.

FIG. 8 is a diagram that illustrates operations to update a sequence of tracked meshes based on displacement maps generated in FIG. 7, in accordance with an embodiment of the disclosure. FIG. 8 is explained in conjunction with elements from FIGS. 1, 2, 3A, 3B, 4A, 4B, 5, 6, and 7. With reference to FIG. 8, there is shown a diagram 800 that includes an updated sequence of tracked meshes 802, which may be obtained based on execution of one or more operations, as described herein.

The circuitry 202 may be configured to update each tracked mesh of the acquired sequence of tracked meshes 302 based on a corresponding displacement map of the generated plurality of displacement maps 704. For example, the plurality of displacement maps 704 may include the displacement map 704A corresponding to the tracked mesh 302A, a displacement map 704B corresponding to the tracked mesh 302B and the displacement map 704J corresponding to the tracked mesh 302J. This update may yield a sequence of high-quality, high-frame-rate tracked meshes. With availability of a displacement map for each tracked mesh, it may be possible to transfer the fine geometric details of a (raw) 3D scan onto a tracked mesh. Thus, the displacement maps produced by the trained neural network model 114 may be applied to the acquired sequence of tracked meshes 302 to update the sequence of tracked meshes 302 with fine geometric details included in the set of 3D scans 304. This may eliminate a need to manually extract and process the geometric details by using known software tools.

In an embodiment, before each tracked mesh is updated, the circuitry 202 may be configured to resample each displacement map of the generated plurality of displacement maps 704 until the resolution of the resampled displacement map corresponds to a polycount of a 3D scan of the acquired set of 3D scans 304. For example, the number of pixels in the resampled displacement map may match a number of vertices or points in the 3D scan. In such a case, the update of the sequence of tracked meshes 302 may include a first application of a resampling operation on each tracked mesh of the sequence of tracked meshes 302 until a polycount of each resampled mesh of the resampled sequence of tracked meshes 302 matches that of a corresponding 3D scan of the set of 3D scans 304. Additionally, the update of the sequence of tracked meshes 302 may include a second application of each resampled displacement map of the resampled set of displacement maps 404 onto a corresponding resampled mesh of the resampled sequence of tracked meshes 302, to obtain the updated sequence of tracked meshes 802. For example, the resampled displacement map 704A may be applied to the resampled mesh 302A to obtain an updated mesh 802A, the resampled displacement map 704B may be applied to the resampled mesh 302B to obtain an updated mesh 802B and the resampled displacement map 704J may be applied to the resampled mesh 302J to obtain an updated mesh 802J.

In accordance with an embodiment, the updated sequence of tracked meshes 802 may correspond to a set of blend-shapes for animation. For example, the set of blend-shapes may be utilized to animate (such as to provide change in the facial expressions) the face portion of the person 116.

Figure 9:
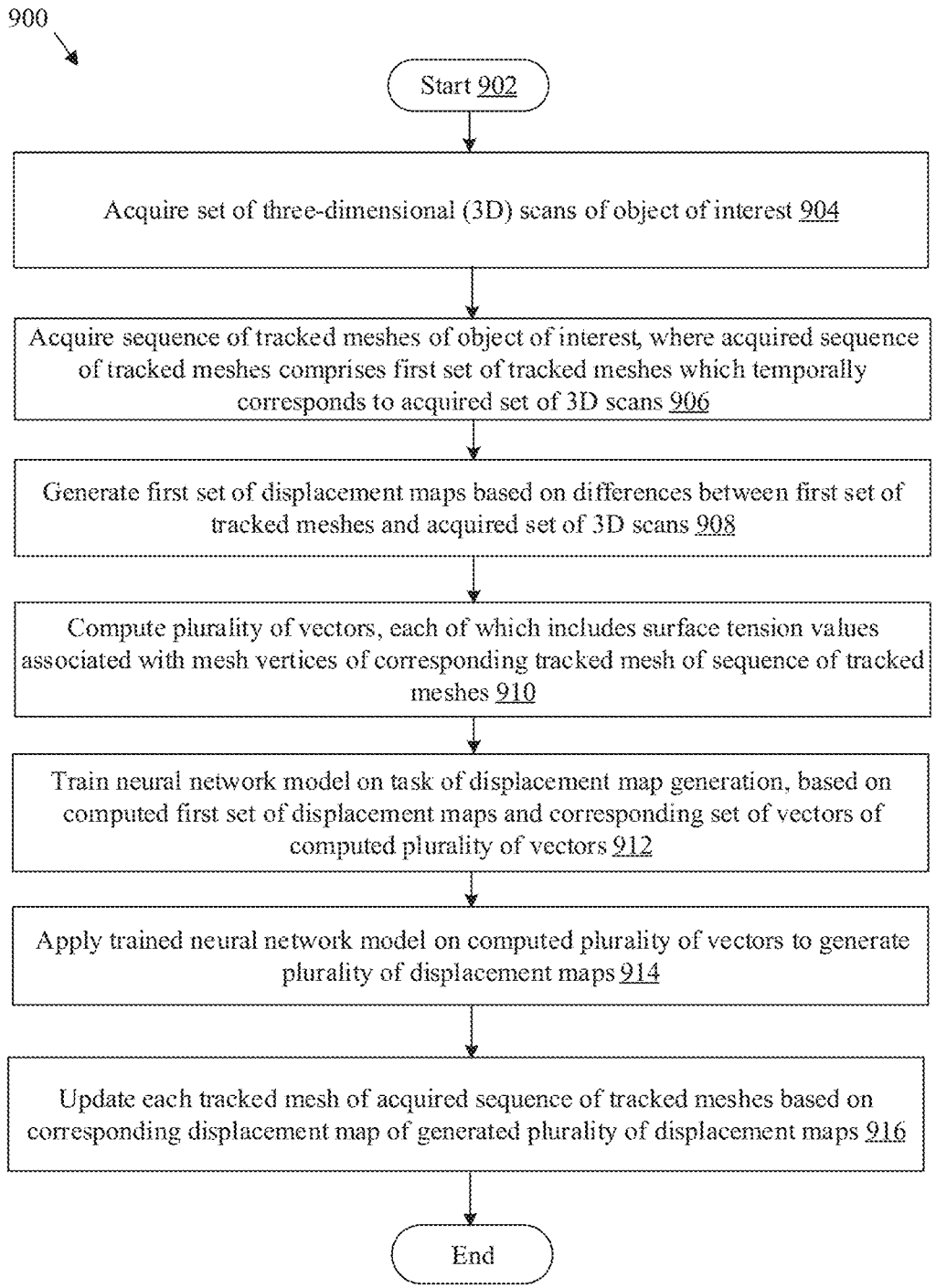
FIG. 9 is a flowchart that illustrates an exemplary method for preserving geometry in tracked meshes, in accordance with an embodiment of the disclosure.

FIG. 9 is a flowchart that illustrates an exemplary method for preserving geometry in tracked meshes, in accordance with an embodiment of the disclosure. FIG. 9 is explained in conjunction with elements from FIGS. 1, 2, 3A, 3B, 4A, 4B, 5, 6, 7 and 8. With reference to FIG. 9, there is shown a flowchart 900. The method illustrated in the flowchart 900 may be executed by any computing system, such as by the electronic device 102 or the circuitry 202. The method may start at 902 and proceed to 904.

At 904, the set of 3D scans 304 of the object of interest may be acquired. In accordance with an embodiment, the circuitry 202 may be configured to acquire the set of 3D scans 304 of the object of interest, such as the face portion of the person 116. Details of the acquisition of the set of 3D scans 304 are further provided for example in FIG. 3A.

At 906, the sequence of tracked meshes 302 of the object of interest may be acquired. In accordance with an embodiment, the circuitry 202 may be configured to acquire the sequence of tracked meshes 302 of the object of interest, such as the face portion of the person 116. The acquired sequence of tracked meshes 302 may include the set of tracked meshes 402 which may temporally correspond to the acquired set of 3D scans 304. Details of the acquisition of the sequence of tracked meshes 302 are further provided for example in FIG. 3A.

At 908, the set of displacement maps 404 may be generated. In accordance with an embodiment, the circuitry 202 may be configured to generate the set of displacement maps 404 based on differences between the set of tracked meshes 402 and the acquired set of 3D scans 304. Details of the generation of the set of displacement maps 404 are further provided for example in FIGS. 4A and 4B.

At 910, the plurality of vectors 702 may be computed. In accordance with an embodiment, the circuitry 202 may be configured to compute the plurality of vectors 702, each of which may include surface tension values associated with mesh vertices of a corresponding tracked mesh of the sequence of tracked meshes 302. Details of the computation of the plurality of vectors 702 are further provided for example in FIG. 5.

At 912, the neural network model 114 may be trained. In accordance with an embodiment, the circuitry 202 may be configured to train the neural network model 114 on a task of displacement map generation, based on the computed set of displacement maps 404 and a corresponding set of vectors 602 of the computed plurality of vectors 702. Details of the training of the neural network model 114 are further provided for example in FIG. 6.

At 914, the trained neural network model 114 may be applied on the computed plurality of vectors 702 to generate the plurality of displacement maps 704. In accordance with an embodiment, the circuitry 202 may be configured to apply the trained neural network model 114 on the computed plurality of vectors 702 to generate the plurality of displacement maps 704. Details of the generation of the plurality of displacement maps 704 are further provided for example in FIG. 7.

At 916, each tracked mesh of the acquired sequence of tracked meshes 302 may be updated based on the corresponding displacement map of the generated plurality of displacement maps 704. In accordance with an embodiment, the circuitry 202 may be configured to update each tracked mesh of the acquired sequence of tracked meshes 302 based on the corresponding displacement map of the generated plurality of displacement maps 704. Details of the update of each tracked mesh of the sequence of tracked meshes 302 are further provided for example in FIG. 8. Control may pass to end.

Although the flowchart 900 is illustrated as discrete operations, such as 902, 904, 906, 908, 910, 912, 914 and 916, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, instructions executable by a machine and/or a computer to operate an electronic device (such as the electronic device 102). The instructions may cause the machine and/or computer to perform operations that may include acquiring a set of three-dimensional (3D) scans (such as the set of 3D scans 122) of an object of interest, such as the person 116. The operations may further include acquiring a sequence of tracked meshes (such as the sequence of tracked meshes 124) of the object of interest. The acquired sequence of tracked meshes 124 may include a set of tracked meshes (such as the set of tracked meshes 402) which temporally corresponds to the acquired set of 3D scans 122. The operations may further include generating a set of displacement maps (such as the set of displacement maps 404) based on differences between the set of tracked meshes 402 and the acquired set of 3D scans 122. The operations may further include computing a plurality of vectors (such as the plurality of vectors 702), each of which may include surface tension values associated with mesh vertices of a corresponding tracked mesh of the sequence of tracked meshes 124. The operations may further include training a neural network model (such as the neural network model 114) on a task of displacement map generation, based on the computed set of displacement maps 404 and a corresponding set of vectors of the computed plurality of vectors 702. The operations may further include applying the trained neural network model 114 on the computed plurality of vectors 702 to generate a plurality of displacement maps (such as the plurality of displacement maps 704). The operations may further include updating each tracked mesh of the acquired sequence of tracked meshes 124 based on a corresponding displacement map of the generated plurality of displacement maps 704.

Exemplary aspects of the disclosure may provide an electronic device (such as the electronic device 102 of FIG. 1) that includes circuitry (such as the circuitry 202). The circuitry 202 may be configured to acquire a set of three-dimensional (3D) scans (such as the set of 3D scans 122) of an object of interest, such as the person 116. The circuitry 202 may be further configured to acquire a sequence of tracked meshes (such as the sequence of tracked meshes 124) of the object of interest. The acquired sequence of tracked meshes 124 may include a set of tracked meshes (such as the set of tracked meshes 402) which temporally corresponds to the acquired set of 3D scans 122. The circuitry 202 may be further configured to generate a set of displacement maps (such as the set of displacement maps 404) based on differences between the set of tracked meshes 402 and the acquired set of 3D scans 122. The circuitry 202 may be further configured to compute a plurality of vectors (such as the plurality of vectors 702), each of which may include surface tension values associated with mesh vertices of a corresponding tracked mesh of the sequence of tracked meshes 124. The circuitry 202 may be further configured to train a neural network model (such as the neural network model 114) on a task of displacement map generation, based on the computed set of displacement maps 404 and a corresponding set of vectors of the computed plurality of vectors 702. The circuitry 202 may be further configured to apply the trained neural network model 114 on the computed plurality of vectors 702 to generate a plurality of displacement maps (such as the plurality of displacement maps 704). The circuitry 202 may be further configured to update each tracked mesh of the acquired sequence of tracked meshes 124 based on a corresponding displacement map of the generated plurality of displacement maps 704.

In accordance with an embodiment, the circuitry 202 may be further configured to synchronize the second imaging device 108 with the first imaging device 106. After the synchronization, the circuitry 202 may control the first imaging device 106 to capture the first sequence of image frames 118 of the object of interest in the dynamic state. The circuitry 202 may further control the second imaging device 108 to capture the second sequence of image frames 120 of the object of interest in the dynamic state.

In accordance with an embodiment, the first imaging device 106 may be the digital still camera and the second imaging device 108 may be the video camera. The first imaging device 106 may capture the first sequence of image frames 118 at a frame rate that may be less than the frame rate at which the second imaging device 108 may capture the second sequence of image frames 120.

In accordance with an embodiment, the image resolution of each of the first sequence of image frames 118 may be greater than an image resolution of each image frame of the second sequence of image frames 120.

In accordance with an embodiment, the circuitry 202 may be further configured to execute a first set of operations including a photogrammetry operation to acquire the set of 3D scans 122. The execution may be based on the captured first sequence of image frames 118.

In accordance with an embodiment, the circuitry 202 may be further configured to execute a second set of operations including a mesh-tracking operation to acquire the sequence of tracked meshes 124. The execution may be based on the captured second sequence of image frames 120 and a parametric 3D model of the object of interest.

In accordance with an embodiment, the polycount in each tracked mesh of the acquired sequence of tracked meshes 124 may be less than a polycount in each 3D scan of the acquired set of 3D scans 122.

In accordance with an embodiment, the circuitry 202 may be further configured to construct a training dataset to include pairs of input-output values, each of which may include a vector of the computed set of vectors 602 corresponding to the set of tracked meshes 402 as an input for the neural network model 114. Each of the pairs of input-output values may further include a displacement map of the generated set of displacement maps 404 as a ground truth for an output of the neural network model 114. The neural network model 114 may be trained for a number for epochs on the pairs of input-output values until a loss between the ground truth and the output of the neural network model 114 is below a threshold.

In accordance with an embodiment, the object of interest is a face portion of the person.

In accordance with an embodiment, the circuitry 202 may be further configured to determine one or more first tracked meshes of the sequence of tracked meshes 124 to be associated with a neutral face expression. The circuitry 202 may determine the surface tension values associated with the mesh vertices of each of the determined one or more first tracked meshes as zero. The circuitry 202 may determine one or more second tracked meshes of the sequence of tracked meshes 124 to be associated with a face expression different from the neutral face expression. The circuitry 202 may further compare the mesh vertices of each of the determined one or more second tracked meshes with reference values of the mesh vertices for the neutral face expression. Based on the comparison, the circuitry 202 may determine the surface tension values associated with the mesh vertices of each of the determined one or more second tracked meshes.

In accordance with an embodiment, the circuitry 202 may be further configured to resample each displacement map of the generated plurality of displacement maps 704 until a resolution of each resampled displacement map of the generated plurality of displacement maps 704 may correspond to a polycount of a 3D scan of the acquired set of 3D scans 122.

In accordance with an embodiment, the update may include a first application of the resampling operation on each tracked mesh of the sequence of tracked meshes 124 until a polycount of each resampled mesh of the resampled sequence of tracked meshes 124 matches that of a corresponding 3D scan of the set of 3D scans 122. The update may further include the second application of each resampled displacement map of the resampled set of displacement maps 404 to a corresponding resampled mesh of the resampled sequence of tracked meshes 124, to obtain the updated sequence of tracked meshes 802.

In accordance with an embodiment, the updated sequence of tracked meshes 802 may correspond to a set of blendshapes for animation.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
circuitry configured to:
  acquire a set of three-dimensional (3D) scans of an object of interest;
  acquire a sequence of tracked meshes of the object of interest,
    wherein the acquired sequence of tracked meshes comprises a set of tracked meshes which temporally corresponds to the acquired set of 3D scans;
  generate a set of displacement maps based on differences between the set of tracked meshes and the acquired set of 3D scans;
  compute a plurality of vectors, each of which includes surface tension values associated with mesh vertices of a corresponding tracked mesh of the sequence of tracked meshes;
  train a neural network model on a task of displacement map generation, based on the computed set of displacement maps and a corresponding set of vectors of the computed plurality of vectors;
  apply the trained neural network model on the computed plurality of vectors to generate a plurality of displacement maps; and
  update each tracked mesh of the acquired sequence of tracked meshes based on a corresponding displacement map of the generated plurality of displacement maps.

2. The electronic device according to claim 1, wherein the circuitry is further configured to:
  synchronize a second imaging device with a first imaging device;
  after the synchronization, control the first imaging device to capture a first sequence of image frames of the object of interest in a dynamic state; and
  control the second imaging device to capture a second sequence of image frames of the object of interest in the dynamic state.

3. The electronic device according to claim 2, wherein the first imaging device is a digital still camera and the second imaging device is a video camera, and
  the first imaging device captures the first sequence of image frames at a frame rate that is less than a frame rate at which the second imaging device captures the second sequence of image frames.

4. The electronic device according to claim 2, wherein an image resolution of each of the first sequence of image frames is greater than an image resolution of each image frame of the second sequence of image frames.

5. The electronic device according to claim 2, wherein the circuitry is further configured to execute a first set of operations including a photogrammetry operation to acquire the set of 3D scans, and wherein the execution is based on the captured first sequence of image frames.

6. The electronic device according to claim 2, wherein the circuitry is further configured to execute a second set of operations including a mesh-tracking operation to acquire the sequence of tracked meshes, and
wherein the execution is based on the captured second sequence of image frames and a parametric 3D model of the object of interest.

7. The electronic device according to claim 1, wherein a polycount in each tracked mesh of the acquired sequence of tracked meshes is less than a polycount in each 3D scan of the acquired set of 3D scans.

8. The electronic device according to claim 1, wherein the circuitry is further configured to construct a training dataset to include pairs of input-output values, each of which comprises of:
a vector of the computed set of vectors corresponding to the set of tracked meshes as an input for the neural network model, and
a displacement map of the generated set of displacement maps as a ground truth for an output of the neural network model,
wherein the neural network model is trained for a number for epochs on the pairs of input-output values until a loss between the ground truth and the output of the neural network model is below a threshold.

9. The electronic device according to claim 1, wherein the object of interest is a face portion of a person.

10. The electronic device according to claim 9, wherein the circuitry is further configured to:
determine one or more first tracked meshes of the sequence of tracked meshes to be associated with a neutral face expression;
determine the surface tension values associated with the mesh vertices of each of the determined one or more first tracked meshes as zero;
determine one or more second tracked meshes of the sequence of tracked meshes to be associated with a face expression different from the neutral face expression;
compare the mesh vertices of each of the determined one or more second tracked meshes with reference values of the mesh vertices for the neutral face expression; and
determine the surface tension values associated with the mesh vertices of each of the determined one or more second tracked meshes, based on the comparison.

11. The electronic device according to claim 1, wherein the circuitry is further configured to resample each displacement map of the generated plurality of displacement maps until a resolution of each resampled displacement map of the generated plurality of displacement maps corresponds to a polycount of a 3D scan of the acquired set of 3D scans.

12. The electronic device according to claim 11, wherein the update comprises of:
a first application of a resampling operation on each tracked mesh of the sequence of tracked meshes until a polycount of each resampled mesh of the resampled sequence of tracked meshes matches that of a corresponding 3D scan of the set of 3D scans; and
a second application of each resampled displacement map of the resampled set of displacement maps to a corresponding resampled mesh of the resampled sequence of tracked meshes, to obtain the updated sequence of tracked meshes.

13. The electronic device according to claim 1, wherein the updated sequence of tracked meshes correspond to a set of blend-shapes for animation.

14. A method, comprising:
acquiring a set of three-dimensional (3D) scans of an object of interest;
acquiring a sequence of tracked meshes of the object of interest,
wherein the acquired sequence of tracked meshes comprises a set of tracked meshes which temporally corresponds to the acquired set of 3D scans;
generating a set of displacement maps based on differences between the set of tracked meshes and the acquired set of 3D scans;
computing a plurality of vectors, each of which includes surface tension values associated with mesh vertices of a corresponding tracked mesh of the sequence of tracked meshes;
training a neural network model on a task of displacement map generation, based on the computed set of displacement maps and a corresponding set of vectors of the computed plurality of vectors;
applying the trained neural network model on the computed plurality of vectors to generate a plurality of displacement maps; and
updating each tracked mesh of the acquired sequence of tracked meshes based on a corresponding displacement map of the generated plurality of displacement maps.

15. The method according to claim 14, further comprising:
synchronizing a second imaging device with a first imaging device;
after the synchronization, controlling the first imaging device to capture a first sequence of image frames of the object of interest in a dynamic state; and
controlling the second imaging device to capture a second sequence of image frames of the object of interest in the dynamic state.

16. The method according to claim 15, further comprising executing a first set of operations including a photogrammetry operation to acquire the set of 3D scans, wherein the execution is based on the captured first sequence of image frames.

17. The method according to claim 15, further comprising executing a second set of operations including a mesh-tracking operation to acquire the sequence of tracked meshes, wherein the execution is based on the captured second sequence of image frames and a parametric 3D model of the object of interest.

18. The method according to claim 14, further comprising constructing a training dataset to include pairs of input-output values, each of which comprises of:
a vector of the computed set of vectors corresponding to the set of tracked meshes as an input for the neural network model, and
a displacement map of the generated set of displacement maps as a ground truth for an output of the neural network model,
wherein the neural network model is trained for a number for epochs on the pairs of input-output values until a loss between the ground truth and the output of the neural network model is below a threshold.

19. The method according to claim 14, further comprising:
- determining one or more first tracked meshes of the sequence of tracked meshes to be associated with a neutral face expression;
- determining the surface tension values associated with the mesh vertices of each of the determined one or more first tracked meshes as zero;
- determining one or more second tracked meshes of the sequence of tracked meshes to be associated with a face expression different from the neutral face expression;
- comparing the mesh vertices of each of the determined one or more second tracked meshes with reference values of the mesh vertices for the neutral face expression; and
- determining the surface tension values associated with the mesh vertices of each of the determined one or more second tracked meshes, based on the comparison.

20. A non-transitory computer-readable medium having stored thereon computer implemented instructions that, when executed by an electronic device, causes the electronic device to execute operations, the operations comprising:
- acquiring a set of three-dimensional (3D) scans of an object of interest;
- acquiring a sequence of tracked meshes of the object of interest,
  - wherein the acquired sequence of tracked meshes comprises a set of tracked meshes which temporally corresponds to the acquired set of 3D scans;
- generating a set of displacement maps based on differences between the set of tracked meshes and the acquired set of 3D scans;
- computing a plurality of vectors, each of which includes surface tension values associated with mesh vertices of a corresponding tracked mesh of the sequence of tracked meshes;
- training a neural network model on a task of displacement map generation, based on the computed set of displacement maps and a corresponding set of vectors of the computed plurality of vectors;
- applying the trained neural network model on the computed plurality of vectors to generate a plurality of displacement maps; and
- updating each tracked mesh of the acquired sequence of tracked meshes based on a corresponding displacement map of the generated plurality of displacement maps.

* * * * *